United States Patent
Egusa et al.

(10) Patent No.: US 7,780,778 B2
(45) Date of Patent: Aug. 24, 2010

(54) PIGMENT DISPERSION AND PAINT

(75) Inventors: Hifumi Egusa, Neyagawa (JP); Shinji Shimada, Neyagawa (JP); Nobuhisa Sudo, Neyagawa (JP); Takashi Koizumi, Neyagawa (JP); Makiko Nanke, Neyagawa (JP)

(73) Assignee: Nippon Point Co., Ltd., Osaka (JP)

( * ) Notice: Subject to any disclaimer, the term of this patent is extended or adjusted under 35 U.S.C. 154(b) by 1274 days.

(21) Appl. No.: 11/316,982

(22) Filed: Dec. 27, 2005

(65) Prior Publication Data

US 2006/0141162 A1  Jun. 29, 2006

(30) Foreign Application Priority Data

Dec. 28, 2004  (JP) ............................ 2004-380017

(51) Int. Cl.
 *C04B 14/00* (2006.01)
 *C08G 77/04* (2006.01)
 *C08G 59/68* (2006.01)

(52) U.S. Cl. .................... 106/400; 528/26; 528/408

(58) Field of Classification Search .............. 106/400; 528/26, 408

See application file for complete search history.

(56) References Cited

U.S. PATENT DOCUMENTS

| 3,528,836 A | | 9/1970 | Craig ......................... 106/300 |
| 5,034,508 A | * | 7/1991 | Nishizaki et al. ............ 528/408 |
| 5,171,631 A | | 12/1992 | Adkins ....................... 428/328 |
| 5,952,443 A | * | 9/1999 | Wilt et al. ..................... 528/26 |
| 6,475,613 B1 | * | 11/2002 | Ide et al. ..................... 428/323 |

FOREIGN PATENT DOCUMENTS

| JP | 6-340828 A | 12/1994 |
| JP | 2003-165925 A | 6/2003 |
| JP | 2004-224949 A | 8/2004 |
| JP | 2004-224950 A | 8/2004 |

\* cited by examiner

*Primary Examiner*—Jerry Lorengo
*Assistant Examiner*—Shuangyi Abu Ali
(74) *Attorney, Agent, or Firm*—Kubovcik & Kubovcik

(57) ABSTRACT

A first pigment made of a coloring pigment having a primary average particle diameter of 200 nm or smaller or, or made of carbon black having an average particle diameter of a structure of 100 nm or smaller, and a second pigment made of barium sulfate having a primary average particle diameter of 55 nm or smaller are combined so that a value of (acid amount-base amount) of one pigment becomes positive, and a value of (acid amount-base amount) of other pigment becomes negative, and the combined first and second pigments are dispersed in a medium in the presence of a pigment dispersant.

8 Claims, 1 Drawing Sheet

F I G. 1
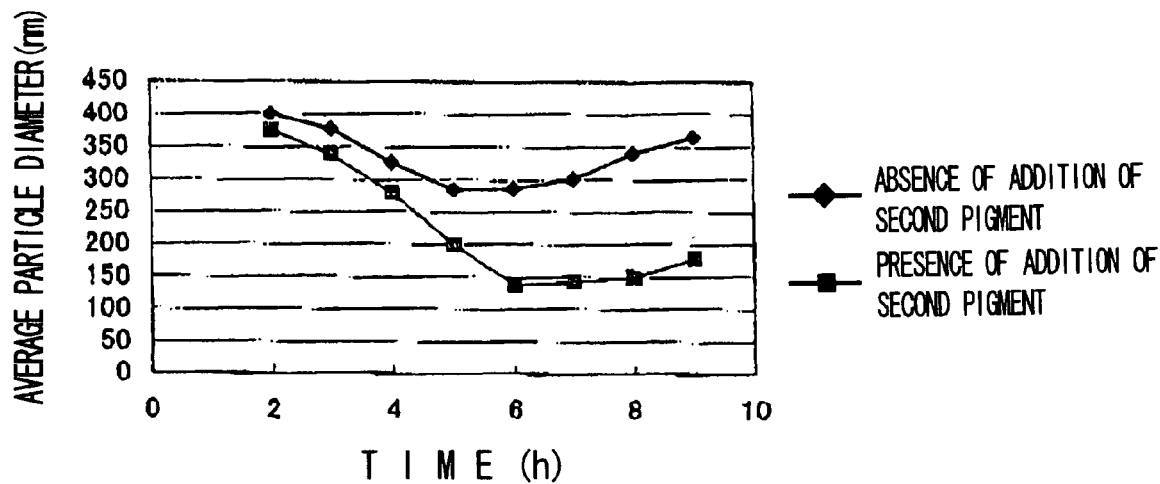
F I G. 2
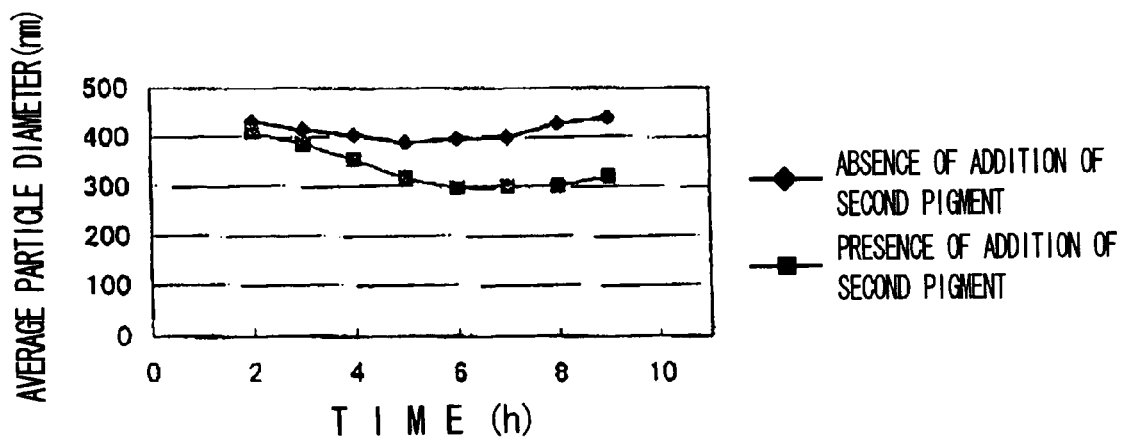

PIGMENT DISPERSION AND PAINT

BACKGROUND OF THE INVENTION

1. Field of the Invention

The present invention relates to a pigment dispersion in which a coloring pigment or carbon black is dispersed in a medium, and a paint using the same.

2. Description of the Related Art

A coloring pigment and carbon black are used as a coloring agent in paints and printing inks and, when a coated film having a clear hue and high gloss is formed, it is necessary to use a coloring pigment and/or carbon black having a small particle diameter. However, there was a problem that a coloring pigment and carbon black having a small particle diameter are generally aggregated easily and, for this reason, they cannot be dispersed in the better dispersed state.

On the other hand, since barium sulfate has a smaller refractive index than that of other inorganic substances, and has a refractive index close to that of a coated film constructed of an organic substance, transparency can be obtained when blended in a paint, therefore, barium sulfate has been previously used as a transparent pigment. Also in barium sulfate as such the transparent pigment, it is required to blend barium sulfate having a small particle diameter. However, there was a problem that, when a particle diameter grows smaller, barium sulfate is easily aggregated and, when this is blended at a larger amount, clouding is generated in a coated film, and transparency is deteriorated.

Japanese Patent Application Laid-Open No. 2004-224949 discloses a process for preparing a composite pigment by dry-treating an organic pigment or carbon black, an organic coloring matter pigment derivative having an acidic or basic functional group or a triazine derivative having an acidic or basic functional group, and an inorganic powder such as barium sulfate. According to such the process, it is said that an organic dye derivative or a triazine derivative plays a role of mediating an organic pigment or carbon black and an inorganic powder, and a uniform composite pigment can be obtained.

Japanese Patent Application Laid-Open No. 2004-224950 discloses a process for preparing carbon black completed with an inorganic particle by adsorbing an organic dye derivative having a basic functional group or a triazine derivative having a basic functional group onto carbon black, and treating this with an inorganic particle such as barium sulfate at a pH region in which an inorganic particle has a minus surface charge.

Japanese Patent Application Laid-Open No. 2004-224949 proposes a process for preparing a composite pigment by dry treatment, but even when a composite pigment obtained by such the process is used, the sufficiently better dispersed state cannot be obtained in some cases. In addition, in Japanese Patent Application Laid-Open No. 2004-224950, since complexed carbon black is prepared in an aqueous medium, when this is added to a solvent-based paint, it must be dried once, aggregation is easily produced in a drying step and, when this is blended in a paint, the sufficiently better dispersed state is not obtained in some cases. An average particle diameter of composite pigments obtained by these prior art processes was around 400 to 800 nm when carbon black was complexed.

SUMMARY OF THE INVENTION

An object of the present invention is to provide a pigment dispersion containing a coloring pigment which has a small particle diameter and is easily aggregated, or carbon black in the better dispersed state, and a paint using the same.

The pigment dispersion of the present invention is characterized in that a first pigment containing a coloring pigment having a primary average particle diameter of 200 nm or smaller or carbon black having an average particle diameter of a structure of 100 nm or smaller, and a second pigment containing barium sulfate having a primary average particle diameter of 55 nm or smaller are combined so that a value of (acid amount-base amount) of one pigment becomes positive, and a value of (acid amount-base amount) of other pigment becomes negative, and the combined first and second pigments are dispersed in a medium in the presence of a pigment dispersant.

According to the present invention, by combining a first pigment and a second pigment so that a value of (acid amount-base amount) of one pigment becomes positive, and a value of (acid amount-base amount) of other pigment becomes negative, and dispersing the first pigment and the second pigment in a medium simultaneously in the presence of a pigment dispersant, a coloring pigment or a carbon black which is a first pigment can be dispersed in the better dispersed state. Therefore, for example, a coloring pigment or carbon black can be dispersed so that an average particle diameter becomes 400 nm or smaller.

In the present invention, (acid amount-base amount) of a pigment is a value obtained by subtracting a base amount of a pigment from an acid amount of a pigment. An acid amount and a base amount of a pigment can be measured by the method described, for example, in Toshikazu Kobayashi and Shoji Ikeda, Journal of Japan Chemical Society, 1993, pp. 145-146.

Specifically, an acid amount is measured as follows: First, 2 g of a pigment, and 30 ml of a methyl isobutyl ketone (MIBK) solution in which dimethylethanolamine (DMEA) is dissolved at $10^{-2}$ mol/liter is placed into an Erlenmeyer flask, the flask is sealed, and this is ultrasound-dispersed for 1 hour in an ultrasound washing equipment controlled at 20° C. This dispersion is centrifuged to remove a pigment, 10 ml of the resulting supernatant is diluted with 100 ml of MIBK, and this is titrated with $10^{-2}$ mol/liter of a perchloric solution (reverse titration) to determine an acid amount.

For measuring a base amount, first, 2 g of a pigment, and 30 ml of a MIBK solution in which acidic as an acid is dissolved to $10^{-2}$ mol/liter are placed into an Erlenmeyer flask, the flask is sealed, and this is ultrasound-dispersed for 1 hour in an ultrasound washing equipment controlled at 20° C. This dispersion is centrifuged to remove a pigment, 10 ml of the resulting supernatant is diluted with 100 ml of MIBK, and this is titrated (reverse titration) with $10^{-2}$ mol/liter of a potassium methoxide solution to determine a base amount.

Both of an acid amount and a base amount of a pigment are generally obtained in a unit of μmol/g. By subtracting a base amount of a pigment from an acid amount of a pigment which has been obtained as described above, a value of (acid amount-base amount) in the present invention can be obtained.

In present invention, pigments are combined so that a value of (acid amount-base amount) of one pigment becomes positive, and a value of (acid amount-base amount) of other pigment becomes negative. Therefore, when a value of (acid amount-base amount) of a first pigment containing a coloring pigment or a carbon black is positive, barium sulfate having a negative value of (acid amount-base amount) of a pigment is used as a second pigment. Conversely, when a value of (acid amount-base amount) of a first pigment is negative, barium sulfate having a positive value of (acid amount-base amount) is used as a second pigment.

In the present invention, a primary average particle diameter coloring pigment used as a first pigment is 200 nm or smaller, more preferably 150 nm or smaller. A lower limit is not particularly limited, but generally, 20 nm or larger is used from a viewpoint of easy preparation or availability.

In the present invention, an average particle diameter of a structure of carbon black used as a first pigment is 100 nm or smaller, more preferably 50 nm or smaller. A lower limit is not particularly limited, but generally, 10 nm or larger is used from a viewpoint of easy preparation or availability. An average particle diameter of a primary particle of carbon black, that is, an average primary particle diameter is preferably 50 nm or smaller, more preferably 30 nm or smaller. And, a lower limit is not particularly limited, but 5 nm or larger is used from a viewpoint of easy preparation or availability.

In the present invention, a primary average particle diameter of barium sulfate used as a second pigment is 55 nm or smaller, more preferably 50 nm or smaller. When a primary average particle diameter grows larger than 55 nm, the effect of the present invention that, by combining a first pigment and a second pigment, pigments can be dispersed in the better dispersed state cannot be sufficiently obtained.

A primary average particle diameter of a coloring pigment and an average particle diameter of a structure of carbon black are an average particle diameter measured by observation with an electron microscope. A primary particle diameter of carbon black is a diameter of a spherical part of a structure.

In addition, an average particle diameter of barium sulfate which is a second pigment is also an average particle diameter measured by observation with an electron microscope as described above.

In the present invention, it is preferable to measure an average particle diameter of a pigment dispersion, that is, an average particle diameter of a dispersion in which a first pigment and a second pigment are simultaneously dispersed with a particle size distribution measuring apparatus which can measure in an nm order. As such the particle size distribution measuring apparatus, nanotrack particle size distribution measuring apparatus (manufactured by Nikkiso Cop., Ltd.) using a dynamic light scatter method/laser Doppler method (UPA method), can be used.

In the present invention, a weight blending ratio of a first pigment and a second pigment is preferably 2:8 to 8:2, more preferably 7:3 to 3:7. By adopting such the blending ratio, the better dispersed state can be obtained.

In the present invention, it is preferable that an average particle diameter of a pigment dispersion in which pigments are mixed and dispersed simultaneously is 5-fold or less of a primary average particle diameter of a coloring pigment, or 5-fold or less of an average particle diameter of a structure of carbon black.

Examples of the coloring pigment used in the present invention include organic pigments such as azo pigments such as soluble and insoluble azo pigments, and fused azo pigments, phthalocyanine-based pigments, quinacridone-based pigments, isoindolinone-based pigments, perylene•perynone-based pigments, dioxazine-based pigments, anthraquinone-based pigments, diketopyrrolopyrrole-based pigments, benzimidazolone-based pigments, anthrapyrimidine-based pigments, anthanthrone-based pigments, indanthrone-based pigments, flavanethrone-based pigments, and thioindigo-based pigments; and inorganic pigments such as titanium oxide, zinc sulfide, lead white, lead yellow, cadmium yellow, cadmium red, iron oxide red, iron black, zinc oxide, Prussian blue pigment, ultramarine blue pigment, iron oxide, and chromate pigment. Alternatively, a mixture thereof may be used. A pigment may be a crude pigment.

Carbon black used in the present invention is not particularly limited, but furnace black and acetylene black which are generally used can be used. Specifically, examples include carbon black Color Black Fw 200, Color Black Fw 200P, and Color Black Fw 285 manufactured by Degussa Ltd.; Raven 5750, Raven 5250, Raven 5000, and Raven 3500 manufactured by Colombia; Emperor 2000, Monarch 1000, Monarch 1100, Monarch 1300, and Monarch 1400 manufactured by Cabott, Inc. The aforementioned pigments may be used alone, or may be used by selecting a plurality of kinds within the aforementioned respective groups or between respective groups, and combining them.

In the present invention, a first pigment and a second pigment are simultaneously dispersed in a medium with a dispersing machine such as a SG mill in the presence of a pigment dispersant.

A content of a coloring pigment or carbon black in a pigment dispersion is preferably in a range of 1 to 20% by weight. A content of barium sulfate in a pigment dispersion is preferably 0.3 to 50% by weight. When a content of barium sulfate is more than this, water resistance is deteriorated and, conversely, when the content is less than this, the effect of the present invention is not sufficiently obtained in some cases.

Examples of the dispersing machine for preparing a pigment dispersion include a SG mill, a ball mill, a bead mill, a spike mill, a pearl mill, a Dyno mill, 2- or 3-roll mill, an extruder, a paint shaker, ultrasound treatment, a homogenizer, a kneader, and flushing treatment. Examples of the media upon dispersing include zircon beads, zirconia beads, soda lime glass beads, alkali-free beads, alumina beads, and silicon beads.

As the pigment dispersant, nonionic or anionic pigment dispersants are preferably used.

Examples of the nonionic pigment dispersant include nonionic surfactants such as polyoxyethylene alkyl ether such as polyoxyethylene lauryl ether, polyoxyethylene stearyl ether, and polyoxyethylene oleyl ether, polyoxyethylene alkyl phenyl ether such as polyoxyethylene octyl phenyl ether, and polyoxyethylene nonyl phenyl ether, polyoxyethylene alkyl ester such as polyethylene glycol dilaurate, and polyethylene glycol distearate, polyoxyethylene sorbitan fatty acid ester, polyoxyethylene alkylamine, polyoxyethylene alkylamide, and acetylene glycol. Nonionic surfactants may be used by mixing two or more kinds. The amount of a nonionic surfactant to be added is preferably in a range of around 0.1 to 5% by weight, more preferably in a range of about 0.5 to 2% by weight relative to a dispersion.

Preferable examples of the anionic pigment dispersion include a polymer amine-based pigment dispersant.

The polymer amine-based pigment dispersant is a straight polymer having a pigment affinity part consisting of a basic pigment affinity group on at least one end (including both ends) of a main chain, due to a block or graft structure. Examples of the basic pigment affinity group include a tertiary amino group, and a heterocyclic group having quaternary ammonium or a basic nitrogen atom, and examples of the straight polymer include any one kind of polyacrylate, polyurethane, polyester and modified entities thereof. Examples of such the heterocyclic group include a pyrrole group, an imidazole group, a pyridinyl group, and a pyrimidinyl group.

In addition, it is preferable that there are 2 to 3000 basic pigment affinity groups in one molecule. When the number of the groups is less than 2, color unevenness is generated. When the number of the groups exceeds 3000, a viscosity is too high, and there is a possibility that handling becomes difficult. The number of the groups is more preferably 5 to 1500.

It is preferable that the polymer amine-based pigment dispersant has a number average molecular weight of 1000 to 1000000. When the number average molecular weight is less than 1000, color unevenness may be generated and, when the number average molecular weight exceeds 1000000, a viscosity is too high, and there is a possibility that handling becomes difficult. More preferably, the number average molecular weight is 2000 to 500000.

For example, as the amine-based pigment dispersant, "BYK-160", "BYK-161", "BYK-162", "BYK-180", "BYK-181", "BYK-182" (all manufactured by BYK Chemie GmbH), "Solsparse 20000" (manufactured by Zeneka), and "EFKA-4550", and "EFKA-4580" (all manufactured by Efka Additives) can be used.

As the nonionic pigment dispersant, "BYK-190" and "BYK-191" (all manufactured by BYK Chemie GmbH) can be used.

Examples of other pigment dispersant include polymer dispersants such as EFKA-46, EFKA-47, EFKA-47EA, EFKA polymer 100, EFKA polymer 400, EFKA polymer 401, and EFKA polymer 450 (all manufactured by Efka Additives), Disperse Aid 6, Disperse Aid 8, Disperse Aid 15, and Disperse Aid 9100 (manufactured by San Nopko Limited), and various Solsparse dispersants such as Solsparse 3000, 5000, 9000, 12000, 13240, 13940, 17000, 24000, 26000, and 28000 (manufactured by Zeneka Co., Ltd.).

A blending amount of the pigment dispersant in a paint is preferably 5 to 120% by weight relative to a pigment solid matter. When this blending amount is less than 5% by weight, there is a possibility that a particle size becomes too great and, when the blending amount exceeds 120% by weight, there is a possibility that storage stability is deteriorated. More preferably, the blending amount is 10 to 100% by weight.

A medium for the pigment dispersant of the present invention may be an organic solvent, deionized water, or a mixture of deionized water and a solvent. Examples of the organic solvent include Solvesso 100 (trade name), Solvesso 150 (trade name), xylene, toluene, butyl acetate, ethyl acetate, Shell Sol TK (trade name), ethoxyethyl propionate (EEP), methoxypropanol (MP), propylene glycol monomethyl ether acetate (PMAC), and butanol.

In addition, examples of the aqueous solvent include deionized water, methanol, ethanol, butanol, butylcellosolve, dipropylene glycol monomethyl ether (DTM), glycol-based solvent, and glycol ether-based solvent.

The solid color paint of the present invention is characterized in that it contains the pigment dispersant of the present invention, and a binder. When a medium for a pigment dispersion is an organic solvent, a binder soluble in an organic solvent is used. As the binder, a coated film forming resin is used and, for example, an acrylic resin, a polyester resin, an alkyd resin, a fluorine resin, an epoxy resin, a polyurethane resin, and a polyether resin are used. Among them, particularly, an acrylic resin and a polyester resin are preferably used. These resins can be used by combining two or more kinds.

When the coated film forming resin is a resin having curability, generally, curing agents such as an amino resin, and a (block) polyisocyanate compound are used by mixing them.

When a solvent for a pigment dispersant is an aqueous solvent, an emulsion resin, a water-soluble resin, or a water-dispersible resin is used as a binder. As these resins, the same coated film forming resin as that described above can be used. In addition, as a curing agent, the same curing agent as that described above can be used.

The metallic paint of the present invention is characterized in that it contains the pigment dispersant of the present invention, a scaly luster color pigment, and a binder. As the binder, the same binder as that for the solid color paint can be used depending on whether a medium for the pigment dispersant is an organic solvent or an aqueous solvent.

Examples of the scaly luster color pigment include an aluminum flake pigment, a colored aluminum flake pigment, a mica pigment, a metal titanium flake pigment, an alumina flake pigment, a silica flake pigment, a titanium dioxide-covered glass flake pigment, a graphite pigment, a stainless flake pigment, a hologram pigment, a plate-like iron oxide pigment and a phthalocyanine flake pigment.

In the solid color paint and the metallic paint, a content of the pigment dispersant of the present invention is preferably in a range of 0.03 to 50%, more preferably 0.05 to 30% in terms of PWC.

In the solid color paint and the metallic paint, a content of the binder is preferably 0.03 to 70% by weight, more preferably 0.05 to 50% by weight in terms of a solid matter in a coated film.

In addition, in the metallic paint, a content of the scaly luster color pigment is preferably in a range of 0.05 to 30%, more preferably 0.1 to 25% in terms of PWC.

The solid color paint and the metallic paint of the present invention can be used in forming a multilayer coated film by coating, for example, by a 2 coating and 1 baking coating method, or a 3 coating and 1 baking coating method.

A coated film forming method of the present invention for forming a coated film by a 2 coating and 1 baking coating method is characterized in that it comprises a step of coating the solid color paint or metallic paint on a subject to be coated, to form a solid coated film or a metallic coated film, a step of coating a clear coating film on a solid coated film or a metallic coated film in wet on wet, to form a multilayer coated film, and a step of baking and curing the multilayer coated film simultaneously.

A coated film forming method of the present invention for forming a coated film by a 3 coating and 1 baking coating method is characterized in that it comprises a step of coating an intermediate paint on a subject to be coated, to form an intermediate coated film, a step of coating the solid color paint or the metallic paint of the present invention on the intermediate coated film in wet on wet, to form a solid coated film or a metallic coated film and, thereafter, coating a clear paint thereon in wet on wet, to form a multilayer coated film, and a step of baking and curing the multilayer coated film simultaneously.

The clear paint is not particularly limited, but a clear paint containing a coated film forming thermosetting resin and a curing agent can be utilized. Examples of a form of this clear paint include a solvent type, an aqueous type and a powder type.

Preferable examples of the solvent type clear paint include a combination of an acrylic resin and/or a polyester resin and an amino resin, and an acrylic resin and/or a polyester resin having a carboxylic acid•epoxy curing system from a viewpoint of transparency and acid-resistant etching.

In addition, examples of the aqueous type clear paint include an aqueous type clear paint containing a resin obtained by neutralizing a coated film forming resin contained in an example exemplified as the solvent type clear paint with a base to make it aqueous. This neutralization can be performed by adding tertiary amine such as dimethylethanolamine and triethylamine before or after polymerization.

On the other hand, as the powder type clear paint, a conventional powder paint such as thermoplastic and thermosetting powder paints can be used. Since a coated film having the better physical property is obtained, a thermosetting powder paint is preferable. Specific examples of the thermosetting powder paint include epoxy-based, acryl-based and polyester-based powder clear paints, and an acryl-based powder clear paint having the better weather resistance is particularly preferable.

As the powder type clear paint used in the present invention, an epoxy-containing acrylic resin/polyvalent carboxylic acid-based powder paint is particularly preferable because there is no volatile substance at curing, the better appearance is obtained, and yellowing is small.

Further, in order to maintain coating workability, it is preferable that a viscosity controlling agent is added to the clear paint. As the viscosity controlling agent, agents exhibiting thixotropy can be generally used. If necessary, a curing catalyst, and a surface regulating agent may be contained.

As the article to be coated, the present invention can be advantageously used in various substrates, for example, metals, plastics, and expanded entities, particularly, metal surfaces and cast products, and can be particularly preferably used in metal products which can be cation electrodeposition-painted.

Examples of the metal product include iron, copper, aluminum, tin, and zinc, and alloys containing these metals. Specifically, examples include bodies and parts of motorcars such as automobiles, trucks, motorcycles, and buses. It is particularly preferable that these metals have been chemically pretreated with phosphate or chromate in advance.

In addition, in a substrate used in the coated film forming method of the present invention, an electrodeposited coated film and an intermediate coated film may be formed on a chemically pretreated steel plate. As an electrodeposition paint for forming an electrodeposited coated film, cation type and anion type paints can be used, and a cation type electrodeposition paint composition is preferable since a multilayer coated film excellent in anti-corrosion is given.

As an intermediate paint for forming an intermediate coated film, a gray based paint of melamine curing system or isocyanate curing system, as a main pigment, carbon black and titanium dioxide is used. Further, a paint adopting a hue with overcoating, and a combination of various coloring pigments may be used.

As a method of coating various paints, the general method such as an electrostatic coating method can be used.

A curing temperature for curing a multilayer coated film is not particularly limited, but is appropriately selected depending on kinds of a used resin and a curing agent. For example, the temperature is set at 80 to 180° C., preferably 120 to 160° C. A curing type varies depending on a curing temperature and, for example, around 10 to 30 minutes at 120° C. to 160° C. is suitable.

A coated article of the present invention is characterized in that it is formed by the coated film forming method of the present invention.

In a pigment dispersion according to the present invention, a coloring pigment or carbon black which has a small particle diameter and is easily aggregated is used as a first pigment and, according to the present invention, by dispersing the first pigment simultaneously with barium sulfate which is a second pigment, aggregation between coloring pigments or between carbon blacks is suppressed, pigments can be dispersed at a smaller particle diameter than the previous particle diameter, and the better dispersed state can be obtained.

Since in the solid color paint using the pigment dispersion of the present invention, aggregation of a coloring pigment or carbon black pigment in a paint is small, a tinting power and transparent feeling are excellent, and a coated film having a clear hue which is originally possessed by a coloring pigment or carbon black can be formed.

The metallic paint containing the pigment dispersion of the present invention is excellent in transparent feeling, and has no clouding in a shade seen slant, and can exhibit a deep hue.

BRIEF DESCRIPTION OF THE DRAWINGS

FIG. 1 is a view showing a relationship between a time for mixing and dispersing a first pigment (carbon black) and a second pigment, and an average particle diameter in a pigment dispersion obtained thereby; and FIG. 2 is a view showing a relationship between a time for mixing and dispersing a first pigment (phthalocyanine) and a second pigment, and an average particle diameter in a pigment dispersion obtained thereby.

DESCRIPTION OF THE PREFERRED EMBODIMENTS

The present invention will be explained by specific Examples below, but the present invention is not limited by the following Examples.

<First Pigment>

As a first pigment, the following were used.

Carbon black A: carbon black, trade name "Raven 5000 U III" manufactured by Columbian, average particle diameter of structure 32 nm Carbon black B: carbon black, trade name "Degussa Carbon FW-200P", manufactured by Degussa Ltd., average particle diameter of structure 39 nm Quinacridone magenta: red organic pigment, trade name "Cinquasia Magenta BRT-343D", manufactured by Ciba Speciality Chemicals, primary average particle diameter 70 nm Chlorinated copper phthalocyanine: green organic pigment, trade name "Lyonol Green 6YKP-N", manufactured by TOYO INK MFG. Co., Ltd., primary average particle diameter 90 nm Phthalocyanine: blue organic pigment, trade name "Cyanine Blue G-314NF" manufactured by Sanyo Color Works, LTD., primary average particle diameter 80 nm

[Measurement of Acid Amount and Base Amount]

Regarding each of the aforementioned first pigments, an acid amount and a base amount were measured. Measurement of an acid amount was performed using dimethylethanolamine (DMEA) as a base by the aforementioned method. In addition, measurement of a base amount was performed using acetic acid as an acid as described above. An acid amount and a base amount, as well as results of measurement of (acid amount-base amount) are shown in Table 1.

TABLE 1

| First Pigment | | Acid Amount (DMEA) | Base Amount (Acetic Acid) | (Acid Amount – Base Amount) |
|---|---|---|---|---|
| Color | Kind | µmol/g | µmol/g | µmol/g |
| Black | Carbon Black A | 510 | 77 | 433 |
| Black | Carbon Black B | 850 | 236 | 614 |
| Red | Quinacridone Magenta | 34 | 15 | 19 |
| Green | Chlorinated Copper Phthalocyanine | 11 | −3 | 14 |
| Blue | Phthalocyanine | 5 | 24 | −19 |

<Second Pigment>

As barium sulfate, the following barium sulfate was used.

BF-20: barium sulfate manufactured by Sakai Chemical Industry Co., Ltd., primary average particle diameter 30 nm BF-21: barium sulfate manufactured by Sakai Chemical Industry Co., Ltd., primary average particle diameter 50 nm BF-40: barium sulfate manufactured by Sakai Chemical Industry Co., Ltd., primary average particle diameter 10 nm BF-1: barium sulfate manufactured by Sakai Chemical Industry Co., Ltd., primary average particle diameter 50 nm BF-10: barium sulfate manufactured by Sakai Chemical Industry Co., Ltd., primary average particle diameter 60 nm

[Measurement of Acid Amount and Base Amount]

As described above, an acid amount and a base amount of the aforementioned each barium sulfate were measured, and (acid amount-base amount) was obtained. Measurement results are shown in Table 2.

TABLE 2

| Barium Sulfate | Primary Average Particle Diameter (nm) | Acid Amount (DMEA) µmol/g | Base Amount (Acetic Acid) µmol/g | (Acid Amount – Base Amount) µmol/g |
|---|---|---|---|---|
| BF-20 | 30 | 29 | 67 | −38 |
| BF-21 | 50 | 30 | 25 | 5 |
| BF-40 | 10 | 70 | 120 | −50 |
| BF-1 | 50 | 32 | 25 | 7 |
| BF-10 | 60 | 27 | 26 | 1 |

<Preparation of Pigment Dispersion>

A first pigment and a second pigment were combined as shown in Table 3 and Table 4, and this was mixed to prepare a pigment dispersion. A ratio of mixing a dispersion of a first pigment, and a second pigment was such that pigments (solid matter) in each dispersion became a ratio shown in Table 3 and Table 4, respectively. As a solvent, xylene was used to adjust so that a total of a first pigment and a second pigment became 16% by weight. As a pigment dispersant, an amine-based pigment dispersant (trade name "BYK-182", manufactured by BYK Chemie GmbH) was used. A pigment dispersant, when a first pigment was carbon black, was added at 80 parts by weight relative to 100 parts by weight of the first pigment and, when a first pigment was a coloring pigment, was used at 30 parts by weight relative to 100 parts by weight of the first pigment. Herein, a dispersing resin was used together. An amount of a dispersing resin was added so that a solid matter in a pigment dispersion became 20% by weight.

In addition, as a dispersing media, zirconia beads having a diameter of 0.5 mm was used.

A solution to which the first pigment, the second pigment, the pigment dispersant and the dispersing resin had been added as described above was mixed and dispersed using a SG mill, to disperse the first pigment and the second pigment simultaneously to prepare a pigment dispersion. A rotation rate of a mill was 3000 rpm, and a dispersing time was a time shown in Table 3 and Table 4.

An average particle diameter of the resulting pigment dispersion was measured using a nanotrack particle size distribution measuring apparatus (manufactured by Nikkiso Co., Ltd.). Measurement results are shown in Table 3 and Table 4. In addition, a ratio (particle diameter ratio) of an average particle diameter of a pigment dispersion relative to an average particle diameter of a first pigment is shown in Table 3 and Table 4. In addition, Table 3 and Table 4 also show (acid amount-base amount) of the first pigment and (acid amount-base amount) of the second pigment.

TABLE 3

| | First Pigment | | | Second Pigment Barium Sulfate | Mixing Ratio First Pigment/ Second Pigment | Dispersing Time (h) | (Acid Amount – Base Amount) of First Pigment µmol/g | (Acid Amount – Base Amount) of Second Pigment µmol/g | Pigment Dispersion | |
|---|---|---|---|---|---|---|---|---|---|---|
| | Color | Kind | Average Particle Diameter (nm) | | | | | | Average Particle Diameter (nm) | Particle Diameter Ratio |
| Ex. 1 | Black | Carbon black A | 32 | BF-40 | 5/5 | 6 | 433 | −50 | 139 | 4.3 |
| Ex. 2 | Black | Carbon black B | 39 | BF-40 | 3/7 | 6 | 614 | −50 | 137 | 3.5 |
| Ex. 3 | Red | Quinacridone Magenta | 70 | BF-40 | 5/5 | 6 | 19 | −50 | 221 | 3.2 |
| Ex. 4 | Green | Copper Phthalocyanine | 90 | BF-40 | 7/3 | 6 | 14 | −50 | 221 | 2.5 |
| Ex. 5 | Blue | Phthalocyanine | 80 | BF-21 | 5/5 | 6 | −19 | 5 | 297 | 3.7 |

As shown in Table 3, in Examples 1 to 4, (acid amount-base amount) of a first pigment is positive, and (acid amount-base amount) of a second pigment is negative. In addition, in Example 5, (acid amount-base amount) of a first pigment is negative, and (acid amount-base amount) of a second pigment is positive. Like this, by a combination so that (acid amount-base amount) of one of the first pigment and the second pigment is positive, and (acid amount-base amount) of other pigment is negative, a value of 300 nm or less as an average particle diameter of a pigment dispersion is obtained. In addition, as a ratio (particle diameter ratio) of an average particle diameter of a pigment dispersion relative to an average particle diameter of a first pigment, a value of 5 or less is obtained.

dispersion of only a first pigment and a small average particle diameter is not obtained as shown in Table 4, and it is seen that the better dispersed state is not obtained.

Examples 5 and 7 as well as Comparative Examples 4 to 6 using phthalocyanine as a first pigment are discussed as follows.

In Examples 5 and 7, (acid amount-base amount) of a first pigment is negative, and (acid amount-base amount) of a second pigment is positive. By such the combination, a particle diameter ratio of a pigment dispersion is 5 or less. To the contrary, in Comparative Example 4, (acid amount-base amount) of a first pigment is negative, and (acid amount-base amount) of a second pigment is also negative. By such the

TABLE 4

| | First Pigment | | | Second Pigment Barium Sulfate (Average Particle Diameter) | Mixing Ratio First Pigment/ Second Pigment | Dispersing Time (h) | (Acid Amount − Base Amount) of First Pigment μmol/g | (Acid Amount − Base Amount) of Second Pigment μmol/g | Composite Pigment | |
|---|---|---|---|---|---|---|---|---|---|---|
| | Color | Kind | Average Particle Diameter (nm) | | | | | | Average Particle Diameter (nm) | Particle Diameter Ratio |
| Ex. 1 | Black | Carbon Black A | 32 | BF-40 (10) | 5/5 | 6 | 433 | −50 | 139 | 4.3 |
| Ex. 6 | Black | Carbon Black A | 32 | BF-20 (30) | 5/5 | 6 | 433 | −38 | 154 | 4.8 |
| Comp. Ex. 1 | Black | Carbon Black A | 32 | BF-21 (50) | 5/5 | 6 | 433 | 5 | 299 | 9.3 |
| Comp. Ex. 2 | Black | Carbon Black A | 32 | BF-1 (50) | 5/5 | 6 | 433 | 7 | 324 | 10.1 |
| Comp. Ex. 3 | Black | Carbon Black A | 32 | None | 10/0 | 5 | 433 | — | 285 | 8.9 |
| Ex. 5 | Blue | Phthalocyanine | 80 | BF-21 (50) | 5/5 | 6 | −19 | 5 | 297 | 3.7 |
| Ex. 7 | Blue | Phthalocyanine | 80 | BF-1 (50) | 5/5 | 6 | −19 | 7 | 321 | 4.0 |
| Comp. Ex. 4 | Blue | Phthalocyanine | 80 | BF-40 (10) | 5/5 | 6 | −19 | −50 | 427 | 5.3 |
| Comp. Ex. 5 | Blue | Phthalocyanine | 80 | BF-10 (60) | 5/5 | 6 | −19 | 1 | 419 | 5.2 |
| Comp. Ex. 6 | Blue | Phthalocyanine | 80 | None | 10/0 | 6 | −19 | — | 389 | 4.9 |
| Comp. Ex. 7 | — | — | — | BF-20 | 0/10 | 5 | — | −38 | 197 | — |
| Comp. Ex. 8 | — | — | — | BF-21 | 0/10 | 5 | — | 5 | 299 | — |
| Comp. Ex. 9 | — | — | — | BF-40 | 0/10 | 5 | — | −5 | 119 | — |
| Comp. Ex. 10 | — | — | — | BF-1 | 0/10 | 5 | — | 7 | 276 | — |
| Comp. Ex. 11 | — | — | — | BF-10 | 0/10 | 5 | — | 1 | 314 | — |

Examples 1 and 6 as well as Comparative Examples 1 to 3 shown in Table 4 using carbon black A as a first pigment are discussed as follows.

In Examples 1 to 6, (acid amount-base amount) of a first pigment is positive, and (acid amount-base amount) of a second pigment is negative. By such the combination, a particle diameter ratio of a pigment dispersion is a value of 5 or less, and it is seen that pigments are dispersed at a small particle diameter. To the contrary, in Comparative Examples 1 and 2, (acid amount-base amount) of a first pigment is positive, and (acid amount-base amount) of a second pigment is also positive. By such the combination, a particle diameter ratio of a pigment dispersion is a value exceeding 5, a small average particle diameter is not obtained, and it is seen that the dispersed state is not better. In Comparative Example 3, a second pigment is not mixed, and this is in the state of a combination, a particle diameter ratio of a pigment dispersion is greater than 5, an average particle diameter of a pigment dispersion becomes great, and it is seen that pigments are not dispersed in the better dispersed state.

In addition, in Comparative Example 5, as a second pigment, barium sulfate having an average particle diameter of 60 nm is used. In such the case, even by a combination so that (acid amount-base amount) of a first pigment is positive, and (acid amount-base amount) of a second pigment is negative, a particle diameter ratio of a pigment dispersion is not 5 or less, and it is seen that the better dispersed state is not obtained.

In addition, in Comparative Example 6, it is seen that, since a second pigment is not used, a small average particle diameter as shown in Examples 5 and 7 is not obtained.

In addition, in Comparative Examples 7 to 11, only a second pigment is dispersed, and a dispersion of a second pigment is prepared.

<Relationship Between Mixing and Dispersing Time and Reaching Particle Diameter>

At a formulation of Example 1, a mixing and dispersing time when a first pigment and a second pigment were mixed and dispersed using a SG mill was changed in a range of 2 hours to 9 hours, an average particle diameter of the resulting pigment dispersion was measured, and a relationship between a mixing and dispersing time and an approaching particle diameter was studied. In addition, also a formation corresponding to Comparative Example 3, that is, the case where only a first pigment was dispersed without adding a second pigment was also studied, and results are shown in Table 5 and FIG. 1.

In Table 5 and FIG. 1, "Presence of addition of a second pigment" corresponds to a formulation of Example 1, and "Absence of addition of a second pigment" corresponds to a formulation of Comparative Example 3.

TABLE 5

| | Average Particle Diameter (nm) | |
|---|---|---|
| Time (h) | Presence of Addition of a Second Pigment | Absence of Addition of a Second Pigment |
| 2 | 375 | 401 |
| 3 | 339 | 378 |
| 4 | 280 | 327 |
| 5 | 200 | 285 |
| 6 | 139 | 287 |
| 7 | 143 | 302 |
| 8 | 150 | 341 |
| 9 | 178 | 365 |

As apparent from Table 5 and FIG. 1, it is seen that, when a second pigment is added, an approaching particle diameter becomes smaller as a mixing and dispersing time passes, and the dispersed state becomes better, as compared with the case where a second pigment is not added. In addition, when mixing and dispersing is performed for longer than 6 hours, phenomenon that a particle diameter grows great, and particles are re-aggregated is recognized, but also in this case, it is seen that, by adding a second pigment, re-aggregation is alleviated.

Also when phthalocyanine is used as a first pigment, regarding the case where a second pigment is added, and the case where a second pigment is not added, a relationship between a mixing and dispersing time and an approaching particle diameter was studied as described above. "Presence of addition of a second pigment" corresponds to Example 5, and "absence of addition of a second pigment" corresponds to Comparative Example 6.

TABLE 6

| | Average Particle Diameter (nm) | |
|---|---|---|
| Time (h) | Presence of Addition of a Second Pigment | Absence of Addition of a Second Pigment |
| 2 | 409 | 431 |
| 3 | 387 | 415 |
| 4 | 354 | 404 |
| 5 | 317 | 389 |
| 6 | 297 | 397 |
| 7 | 299 | 400 |
| 8 | 302 | 428 |
| 9 | 322 | 439 |

As shown in Table 6 and FIG. 2, it is seen that, when a second pigment is added, an approaching particle diameter grows smaller as a mixing and dispersing time passes, and the dipsersed state becomes better as compared with the case where a second pigment is not added. In addition, when mixing and dispersing is performed for longer than a constant time, phenomenon that a particle diameter becomes great, and particles are re-aggregated is recognized, but also in this case, it is seen that, by adding a second pigment, re-aggregation is alleviated.

<Study of Ratio of Mixing First Pigment and Second Pigment>

As shown in Table 7, a first pigment and a second pigment were mixed by changing a mixing ratio, and an average particle diameter of the resulting pigment dispersion was measured. Results are shown in Table 7.

TABLE 7

| First Pigment | | | Second Pigment Barium Sulfate (Average Particle Diameter) | Composite Pigment | | | |
|---|---|---|---|---|---|---|---|
| Color | Kind | Average Particle Diameter (nm) | | Mixing Ratio First Pigment/ Second Pigment | Dispersing Time (h) | Average Particle Diameter (nm) | Particle Diameter Ratio |
| Black | Carbon Black A | 32 | BF-40(10) | 0/10 | 5 | 119 | 3.7 |
| | | | | 1/9 | 6 | 170 | 5.3 |
| | | | | 2/8 | 6 | 159 | 5.0 |
| | | | | 3/7 | 6 | 143 | 4.7 |
| | | | | 5/5 | 6 | 139 | 4.3 |
| | | | | 7/3 | 6 | 148 | 4.6 |
| | | | | 8/2 | 6 | 157 | 4.9 |
| | | | | 9/1 | 6 | 250 | 7.8 |
| | | | | 10/0 | 5 | 285 | 8.9 |

As shown in Table 7, by adopting a ratio of 2:8 to 8:2 as a ratio of mixing a first pigment:a second pigment, a small average particle diameter is obtained, and it is seen that mixing of a first pigment and a second pigment in this range is preferable.

<Preparation and Assessment of Solid Color Paint>

[Preparation of Solid Color Paint (Base Paint)]

An acrylic resin and a melamine resin were added to a pigment dispersion at a ratio of 7:3 as expressed by a weight ratio, this was diluted with a mixed solvent of xylene and butyl acetate (weight ratio 5:5) to a non-volatile matter (NV) of 35% by weight, to prepare a solid color paint (base paint). As the acrylic resin, a trade name "Dianal HR" (manufactured by Mitsubishi Rayon Co., Ltd., number average molecular weight=5100, weight average molecular weight=11500, acid value=13.5, hydroxy group value=75) was used and, as the melamine resin, a trade name "Urban 20" (manufactured by Mitsui Chemicals, Inc., number average molecular weight=1300, weight average molecular weight=3500, butylated) was used.

As a pigment dispersion, a dispersion obtained by mixing a first pigment and a second pigment shown in Table 8 to Table 10 at a mixing ratio shown in Table 8 to Table 10 was used.

In the solid color paint shown in Table 8, PWC of carbon black A was adjusted to 5%. In the solid color paint shown in Table 9, PWC of quinacridone magenta is adjusted to 10%. In the solid color paint shown in Table 10, PWC of quinacridone magenta is adjusted to 9%, and PWC of carbon black A is adjusted to 1%.

[2 Coating and 1 Baking Coating]

The aforementioned base paint (solid color paint) was hand spray-coated on a glass plate to a film thickness of 25 µm. After setting for 10 minutes, a clear paint was coated on the base coated film (solid color coated film) at a thickness of 35 µm. As the clear paint, a trade name "MAC O-1810 Clear" (manufactured by Nippon Paint Co., Ltd.) was used. A clear paint was coated, this was set for 10 minutes, and heated at 140° C. for 30 minutes to cure a multilayer coated film.

Regarding the resulting multilayer coated film, a black test plate was inserted under the glass plate, CIE-Lab was measured using a SM color computer (manufactured by Suga Test Instrument Co., Ltd.), and measurement results are shown in Table 8 to Table 10. In addition, a coated film was observed visually, and observation results are shown in Table 8 to Table 10.

TABLE 8

| First Pigment | Second Pigment | Mixing Ratio | Average Particle Diameter in Pigment Dispersion | Average Particle Diameter in Paint | L* | a* | b* | Visual Observation |
|---|---|---|---|---|---|---|---|---|
| Carbon Black A | Absence | 10/0 | 285 | 321 | 1.12 | −0.07 | −0.06 | Δ Shade Clouding |
| Carbon Black A | Presence | 5/5 | 139 | 154 | 0.65 | −0.11 | −0.31 | ○ High Transparent Feeling |

As apparent from results of Table 8, when a pigment dispersion prepared by mixing a first pigment and a second pigment according to the present invention is used, an average particle diameter of a pigment dispersion becomes smaller, and an average particle diameter in a paint becomes smaller. Therefore, in a paint, the better dispersed state is shown. In addition, it is seen that the resulting coated film has lower L*, and is a coated film having strong blackness and a strong tinting power as compared with the case where a second pigment is not added. In addition, when a second pigment was not added, clouding was generated in a shade when seen in an oblique direction, but when a second pigment was added, there was no clouding in a shade when seen in an oblique direction, and this is a coated film having high transparent feeling.

TABLE 9

| First Pigment | Second Pigment | Mixing Ratio | Average Particle Diameter in Pigment Dispersion | Average Particle Diameter in Paint | L* | a* | b* | Visual Observation |
|---|---|---|---|---|---|---|---|---|
| Quinacridone Magenta | Absence | 10/0 | 256 | 287 | 12.22 | 31.36 | 8.12 | Δ Shade Clouding |
| Quinacridone Magenta | Presence | 5/5 | 221 | 232 | 11.13 | 34.74 | 5.37 | ○ High Transparent Feeling |

As apparent from Table 9, when a pigment dispersion obtained by adding a second pigment according to the present invention is used, an average particle diameter of a pigment dispersion is small, and an average particle diameter is small also in a paint. Therefore, it is seen that aggregation is little also in a paint, and the better dispersed state is obtained.

In addition, a value of a* is high, and it is seen that a coated film is a coated film which is strong in a red hue originally possessed by a pigment, and is strong in a tinting power. In addition, as apparent from visual observation, when a second pigment was not used, clouding was generated in a shade when seen in an oblique direction, but in the case where a second pigment was used, there was no clouding in a shade, and this was a coated film having high transparent feeling.

In the paint shown in Table 11, PWC of phthalocyanine was adjusted to 10%. In the paint shown in Table 12, PWC of phthalocyanine was adjusted to 9%, and PWC of carbon black A was adjusted to 1%.

[3 Coating and 1 Baking Coating]

Using the aforementioned base paint (solid color paint), a multilayer coated film was formed by 3 coating and 1 baking as follows.

A cation electrodepositing paint (manufactured by Nippon Paint Co., Ltd., trade name "Power Top V-65") was coated on a steel panel, and an intermediate paint (manufactured by Nippon Paint Co., Ltd., trade name "Orga H880 Gray") was coated at a dry film thickness of 35 μm. After setting for 10 minutes, the coated film was pre-heated at 80° C. for 10

TABLE 10

| First Pigment | Second Pigment | Mixing Ratio | Average Particle Diameter in Pigment Dispersion | Average Particle Diameter in Paint | L* | a* | b* | Visual Observation |
|---|---|---|---|---|---|---|---|---|
| Quinacridone Magenta + Carbon Black A | Absence | 10/0 | 256 | 344 | 4.52 | 7.88 | 0.00 | Δ Shade Clouding |
| Quinacridone Magenta + Carbon Black A | Presence | 5/5 | 221 | 249 | 3.97 | 8.72 | −0.25 | ○ High Transparent Feeling |

As apparent from Table 10, also in the case of a black mixed color in which a small amount of carbon black was mixed with a red pigment, an average particle diameter of a pigment dispersion is small, and an average particle diameter in a paint is also small. Therefore, it is seen that, also when formulated into a paint, aggregation is little, and the dispersed state of a pigment is better.

Since a value of a* is high, it is seen that this is a coated film which is strong in a reddish color originally possessed by a minutes and, thereafter, the aforementioned base paint (solid color paint) was coated at a thickness of 25 μm. After setting for 10 minutes, the same clear paint as that described above was coated at a thickness of 35 μm. After setting for 10 minutes, this was heated at 140° C. for 30 minutes to cure a multilayer coated film.

Regarding the resulting multilayer coated film, CIE-Lab was measured, and the coated film was observed visually as described above. Results are shown in Table 11 and Table 12.

TABLE 11

| First Pigment | Second Pigment | Mixing Ratio | Average Particle Diameter in Pigment Dispersion | Average Particle Diameter in Paint | L* | a* | b* | Visual Observation |
|---|---|---|---|---|---|---|---|---|
| Phthalocyanine | Absence | 10/0 | 389 | 452 | 1.63 | 9.67 | −15.84 | Δ Shade Clouding |
| Phthalocyanine | Presence | 5/5 | 297 | 330 | 1.63 | 8.47 | −16.05 | ○ High Transparent Feeling | pigment, and is strong in a tinting power. In addition, as apparent from visual observation, when a second pigment is not added, clouding is generated in a shade when seen in an oblique direction, but in the case where a second pigment is used, there is no clouding in a shade, and this is a coated film having high transparent feeling.

[Preparation of Base Paint (Solid Color Paint)]

According to the same manner as that described above except that a pigment dispersion obtained by mixing a first pigment and a second pigment shown in Table 11 and Table 12, a base paint (solid color paint) was prepared.

As shown in Table 11, when a second pigment is added, an average particle diameter of a pigment dispersion is small. When formulated this into a paint, an average particle diameter is small, and it is seen that the pigment is dispersed in the better dispersed state.

In the coated film, a value of a* is low, and a coated film which is strong in a bluish color originally possessed by a pigment, and is weak in a red color is obtained. In addition, when a pigment is not added, clouding is generated in a shade when seen in an oblique direction, while when a second pigment is added, there is no clouding in a shade, and transparent feeling becomes high.

TABLE 12

| First Pigment | Second Pigment | Mixing Ratio | Average Particle Diameter in Pigment Dispersion | Average Particle Diameter in Paint | L* | a* | b* | Visual Observation |
|---|---|---|---|---|---|---|---|---|
| Phthalocyanine + Carbon Black A | Absence | 10/0 | 389 | 1924 | 1.38 | 2.50 | −2.80 | ∆ Shade Clouding |
| Phthalocyanine + Carbon Black A | Presence | 5/5 | 297 | 463 | 1.35 | 2.10 | −3.06 | ○ High Transparent Feeling |

As shown in Table 12, when a second pigment is added according to the present invention, an average particle diameter of a pigment dispersion is small. In addition, also in a pigment, an average particle diameter is small, and it is seen that a pigment is dispersed in a paint in the better state.

In addition, in a coated film, a value of a* is small, and a hue which is strong in a bluish color originally possessed by a pigment, and weak in a reddish color is obtained. In addition, by visual observation, when a second pigment is not added, clouding is generated in a shade when seen in an oblique direction, while when a second pigment is added, clouding is not generated in a shade, and a coated film of a hue having high transparent feeling is obtained.

[Preparation of Metallic Paint]

The same acrylic resin and melamine resin as those in the aforementioned base paint (solid color paint) were blended in a pigment dispersion at the same ratio, and aluminum flake was further added to prepare a metallic paint. In addition, as described above, a mixed solvent of xylene and butyl acetate was used to adjust a non-volatile matter (NV) to 35% by weight. As the aluminum flake, trade name "7670 NS" manufactured by Toyo Aluminium K.K. was used.

In the paint shown in Table 13, PWC of carbon black A was adjusted to 2%, and PWC of the luster color pigment (aluminum flake) was adjusted to 10%.

In the paint shown in Table 14, PWC of quinacridone magenta was adjusted to 7.5%, and PWC of the luster color pigment was adjusted to 7.5%.

In the paint shown in Table 15, PWC of quinacridone magenta was adjusted to 6.75%, PWC of carbon black A was adjusted to 0.75%, and PWC of the luster color pigment was adjusted to 7.5%.

In the paint shown in Table 16, PWC of phthalocyanine was adjusted to 7.5%, and PWC of the luster color pigment was adjusted to 7.5%.

[Two Coating and 1 Baking Coating]

Using paints shown in Table 13 to Table 15, 2 coating and 1 baking coating was performed to form a multilayer coated film as described above.

Regarding the resulting multilayer coated film, CIE-Lab was measured at two measurement angles of 15° and 110° using a multiangular spectrophotometer (MA68II manufactured by X-Rite). In each Table, values indicated at 15° and 110° are values obtained by this measurement. An angle of 110° corresponds to a shade.

In addition, in each Table, "average" is a value measured using a multiangular spectrophotometer, and corresponds to an average value of a total angle.

TABLE 13

| First Pigment | Second Pigment | Mixing Ratio | Glitter | Average | | | L* Value | | | Visual Observation |
| | | | | L* | a* | b* | 15° | 110° | 15°/110° | |
|---|---|---|---|---|---|---|---|---|---|---|
| Carbon Black A | Absence | 10/0 | Presence | 56.75 | 0.85 | 5.81 | 98.53 | 13.06 | 7.54 | ∆ Shade Clouding |
| Carbon Black A | Presence | 5/5 | Presence | 53.32 | 0.81 | 6.83 | 99.43 | 12.25 | 8.12 | ○ Shade Blackness Strong in Brightness Change |

As shown in Table 13, when a second pigment is added, an average L* value is low, and it is seen that a coated film strong in blackness is obtained. In addition, a L* value at 110° is small, and it is seen that blackness is strong also in a shade.

TABLE 14

| First Pigment | Second Pigment | Mixing Ratio | Glitter | Average L* | Average a* | Average b* | a* Value 110° | Visual Observation |
|---|---|---|---|---|---|---|---|---|
| Quinacridone Magenta | Absence | 10/0 | Presence | 50.85 | 31.97 | −19.24 | 17.06 | Δ Shade Clouding |
| Quinacridone Magenta | Presence | 5/5 | Presence | 47.52 | 34.35 | −21.41 | 19.54 | ○ Shade Reddish |

As shown in Table 14, when a second pigment is added, a value of a* in average is high, and it is seen that a reddish color is strong. In addition, a value of a* at 110° is also high, and it is seen that a reddish color is strong also in a shade.

TABLE 15

| First Pigment | Second Pigment | Mixing Ratio | Glitter | Average L* | Average a* | Average b* | a* Value 110° | Visual Observation |
|---|---|---|---|---|---|---|---|---|
| Quinacridone Magenta + Carbon Black A | Absence | 10/0 | Presence | 21.12 | 26.91 | 8.72 | 15.02 | Δ Shade Clouding |
| Quinacridone Magenta + Carbon Black A | Presence | 5/5 | Presence | 20.76 | 29.57 | 8.09 | 16.70 | ○ Shade Reddish |

As shown in Table 15, when a second pigment is added, a value of a* in average is high, and it is seen that a reddish color is strong. In addition, a value of a* at 1100 is high, and it is seen that a color is deep red also in a shade.

[Three Coating and 1 Baking Coating]

As described above, using the metallic paint shown in Table 16, 3 coating and 1 baking painting was performed.

The resulting multilayer coated film was assessed as described above.

TABLE 16

| First Pigment | Second Pigment | Mixing Ratio | Glitter | Average L* | Average a* | Average b* | b* Value 110° | Visual Observation |
|---|---|---|---|---|---|---|---|---|
| Phthalocyanine | Absence | 10/0 | Presence | 48.27 | −22.34 | −34.19 | −27.63 | Δ Shade Clouding |
| Phthalocyanine | Presence | 5/5 | Presence | 47.45 | −23.73 | −36.97 | −29.13 | ○ Shade Bluish |

As shown in Table 16, when a second pigment is added, a value of a* in average is low, and it is seen that hue weak in a reddish color and strong in a bluish color is exhibited. In addition, a value of a* at 110° is low, hue weak in a reddish color and strong in a bluish color is exhibited also in a shade, and it is seen that a color is deep in a shade.

What is claimed is:

1. A pigment dispersion consisting of a first pigment made of a coloring pigment having a primary average particle diameter of 200 nm or smaller, or made of carbon black having an average particle diameter of a structure of 100 nm or smaller, and a second pigment made of barium sulfate having a primary average particle diameter of 55 nm or smaller, a pigment dispersant, and a medium, said first pigment and said second pigment being combined so that a value of (acid amount-base amount) of one pigment becomes positive, and a value of (acid amount-base amount) of the other pigment becomes negative, the combined first and second pigments being dispersed in the medium in the presence of said pigment dispersant, and the pigment dispersant being a nonionic or anionic pigment dispersant.

2. The pigment dispersion according to claim 1, wherein a weight blending ratio of the first pigment and the second pigment is 2:8 to 8:2.

3. The pigment dispersion according to claim 1, wherein an average particle diameter of the pigment dispersion is 5-fold or smaller of the primary average particle diameter of the first pigment (in the case of carbon, average particle diameter of structure).

4. The pigment dispersion according to claim 1, wherein the pigment dispersant is an anionic pigment dispersant.

5. The pigment dispersion according to claim 1, wherein the medium is an organic solvent, deionized water, or deionized water and a solvent.

6. The pigment dispersion according to claim 4, wherein the anionic pigment dispersant is a polymer amine-based pigment dispersant.

7. The pigment dispersion according to claim 4, wherein the anionic pigment dispersant is a straight polymer having a pigment affinity part consisting of a basic pigment affinity group on at least one end (including both ends) of a main chain, due to a block or graft structure.

8. The pigment dispersion according to claim 4, wherein the anionic pigment dispersant has a basic pigment affinity group, wherein the basic pigment affinity group is selected from the group consisting of a tertiary amino group, a heterocyclic group having quaternary ammonium or a basic nitrogen atom.

* * * * *